United States Patent [19]

Capurka

[11] Patent Number: 4,964,104
[45] Date of Patent: Oct. 16, 1990

[54] SYSTEM FOR MEASURING POSITION USING ELECTRONIC OR ULTRASONIC DEVICES

[75] Inventor: Zbynek A. Capurka, Palatine, Ill.

[73] Assignee: Motorola Inc., Schaumburg, Ill.

[21] Appl. No.: 294,538

[22] Filed: Jan. 9, 1989

[51] Int. Cl.$^5$ .............................................. G01S 15/06
[52] U.S. Cl. ..................................... 367/99; 367/902
[58] Field of Search ....................... 367/87, 99, 95, 96, 367/902, 105; 340/933

[56] References Cited

U.S. PATENT DOCUMENTS

| Re. 26,826 | 3/1970 | Nolan | 367/87 X |
| 4,542,652 | 9/1985 | Reuter et al. | 367/99 X |
| 4,543,649 | 9/1985 | Head et al. | 367/902 X |
| 4,576,286 | 3/1986 | Buckley et al. | 367/87 X |
| 4,634,947 | 1/1987 | Magori | 367/96 X |
| 4,713,798 | 12/1987 | Kay | 367/96 |
| 4,739,860 | 4/1988 | Kobayashi et al. | 367/99 |

*Primary Examiner*—Thomas H. Tarcza
*Assistant Examiner*—Tod Swann
*Attorney, Agent, or Firm*—Phillip H. Melamed

[57] ABSTRACT

A system for measuring the position of a moving object including transceiver means for sending signals to and receiving signals reflected from both a moving object and a reference object maintaining a known, fixed distance from the moving object, wherein by processing the signals sent and received, the position of the moving object can be determined while the effects of temperature on the speed of sound, frequency changes, false echoes and erroneous signals are minimized or eliminated.

6 Claims, 2 Drawing Sheets

SYSTEM FOR MEASURING POSITION USING ELECTRONIC OR ULTRASONIC DEVICES

TECHNICAL FIELD

This invention relates generally to a system for measuring the position of a moving object and, more particularly, to a system for measuring the position of a moving object using electronic or ultrasonic devices.

BACKGROUND

Conventional echo ranging techniques have been used to detect the presence of, determine the position of, and measure the distance of moving objects. In such systems, ultrasonic waves, having a predetermined frequency, are transmitted towards and are reflected by the moving object. Additionally, these systems may further employ a stationary reference at a fixed distance from the transmitter. This stationary reference is operative to reflect the transmitted waves. The position of the moving object is then calculated by comparing the elapsed time of the reflections from the stationary reference to the elapsed time of the reflections from the moving object.

Such systems are subject to the effects of false echoes and other unwanted signals because the window to read the target reflection must be large enough to accommodate the full range of the distance measured. A need therefore exists to reduce the window necessary to read the target reflection and thereby minimize or eliminate the effects of false echos.

SUMMARY OF THE INVENTION

The needs expressed above are substantially met through the use of the system disclosed herein. This system discloses the use of a reference which moves with and maintains a fixed, known distance from the target. Because the target and reference move together at a fixed distance from each other, a definite relation in time is established between the signals reflected by the target and those signals reflected by the reference. Thus, in processing the signals received, the system searches for a definite relation in time between two reflections. These two reflections must agree as to the known distance between the target and reference. False reflections can be detected and disregarded, if the timing does not agree with the known distance between the target and reference.

DESCRIPTION OF THE DRAWINGS

Figure 1:
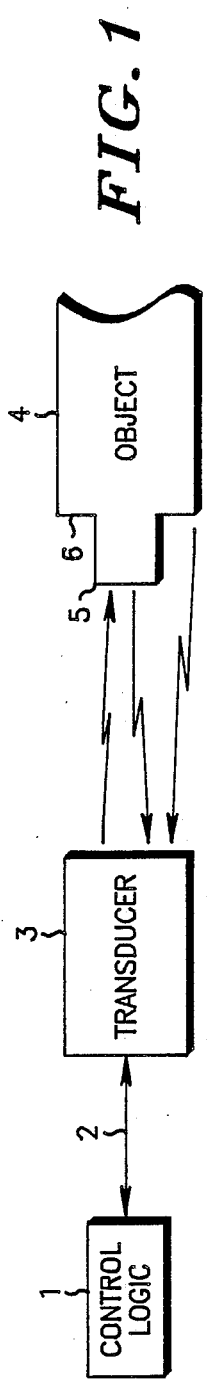
FIG. 1 is a block diagram illustrating an embodiment of the present invention.

Referring to FIG. 1, which is a block diagram illustrating an embodiment of the proposed invention, a signal emanating from electronic circuitry in the control logic (1) travels through a connector (2) to a transducer (3) causing ultrasonic signals to emanate from the transducer (3) toward a moving object (4). The moving object (4) has associated with it at least two reflective surfaces (5 and 6) which reflective surfaces (5 and 6) maintain a known, fixed distance from each other.

An ultrasonic signal emanating from the transducer (3) hits a first reflective surface (5) and is reflected back toward the transducer (3). The signal reflected by the first reflective surface (5) is then sent through the connector (2) to the control logic (1) wherein a counter registers a time value representative of the time between the transmission and reception of the reflected signal from the first reflective surface (5). The ultrasonic signal emanating from the transducer (3) also hits a second reflective surface (6) on the moving object (4) and is reflected back to the transducer (3). The signal reflected by the second reflective surface (6) is then sent through the connector (2) to the control logic (1) wherein a counter registers a time value representative of the time between the transmission and reception of the reflected signal from the second reflective surface (6). The time value of the signal reflected by the first reflective surface (5) is compared to the time value of the signal reflected by the second reflective surface (6) by comparison circuitry in the control logic (1). As the first and second reflective surfaces (5 and 6) maintain a fixed, known distance from each other, by processing the time values obtained from the signals reflected by the first and second reflective surfaces (5 and 6) false echoes can be eliminated and the remaining valid reflections can be used to determine the position of the moving object.

The control logic comprises electronic transmitting circuitry to transmit the original signal and electronic receiving circuitry to receive the signal. The control logic also may include processing circuitry, counters, shift registers, a sequencer and ranging logic connected to a read only memory ROM containing instructions which manage the overall operation of the control logic. The functions of the control logic can be built into an integrated circuit or microprocessor as appropriate.

Figure 2:
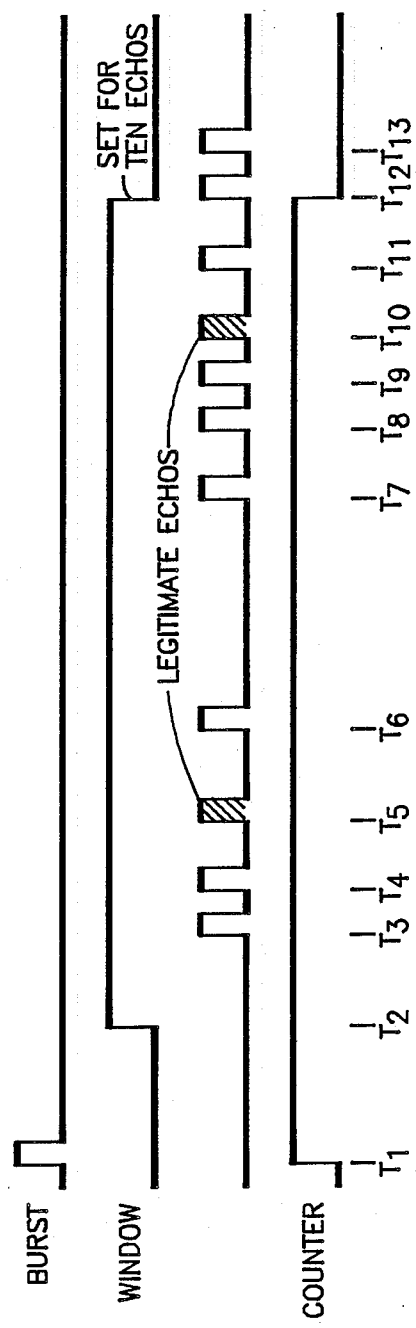
FIGS. 2 and 3 are timing diagrams of the signals as processed in the disclosed invention.
Figure 3:
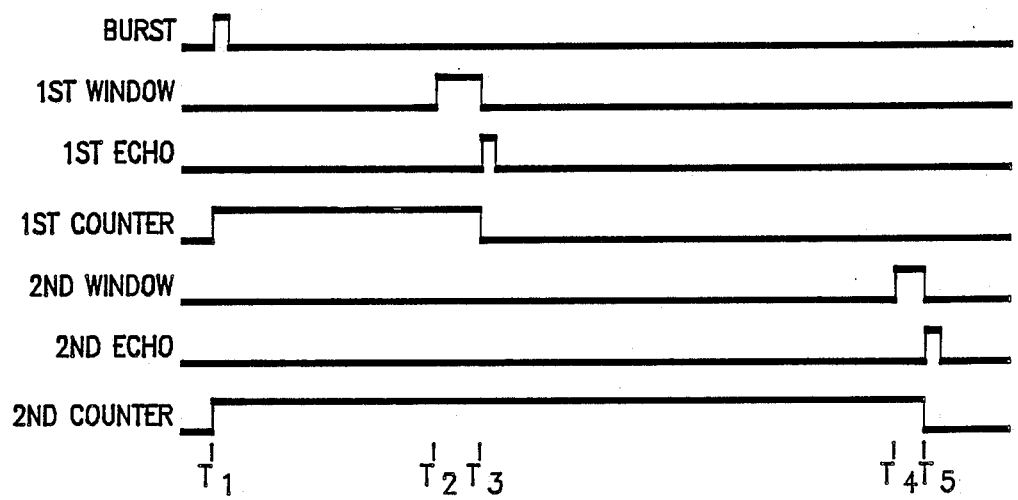

FIGS. 2 and 3 are timing diagrams of the transmission and reception of signals in the proposed invention.

Referring to FIG. 2, a phase/frequency burst is emitted ($T_1$). Upon emission of the burst, a counter begins counting the time for the burst to be reflected. Initially, there is the possibility that multiple reflections of the burst will be received by our system and that some of those reflections are false. At the time ($T_2$) associated with minimum target distance, a window is opened in the system to receive reflections of the modulation burst (such reflections are depicted as occurring at times $T_3$–$T_{12}$). This window is programmed initially to remain open until it receives ten reflections. (The window may be programmed initially to remain open for a set time or to remain open to receive a set number of reflections as desired or appropriate.) The counter registers a time value for each of the reflections ($T_3$–$T_{12}$). By processing the time values ($T_3$–$T_{12}$) of all possible pairs of the reflections and comparing each pair to the known, fixed distance between the target and reference, the approximate position of legitimate reflections for the reference and target can be predicted and subsequent windows can be opened accordingly to read only those legitimate reflections, as shown further in FIG. 3.

Referring to FIG. 3, a subsequent phase/frequency burst is emitted (at time $T_1$). Upon emission of the burst, one counter begins counting the time for the burst to be reflected by the target and returned, and a second counter begins counting the time for the burst to be reflected by the reference and returned. At the time ($T_2$) associated with the minimum or predicted target distance, a window is opened in the circuit to receive the modulation burst reflected by the target. When the reflected burst returns (at time $T_3$), the window closes and the first counter stops. A delay period programmed to reflect the known distance between the target and the reference begins ($T_3$) and ends ($T_4$) when the window is opened in the circuit to receive the modulation burst reflected by the reference. Upon receiving the reflected modulation burst (at time $T_5$), the window closes and the second counter stops. The distance to the target can be processed using the contents of the counters and the known distance between the reference and the target. If desired and where appropriate, a single counter can be used if the counts are transferred to registers. In this timing diagram, the reference and target are interchangeable.

Figure 4:
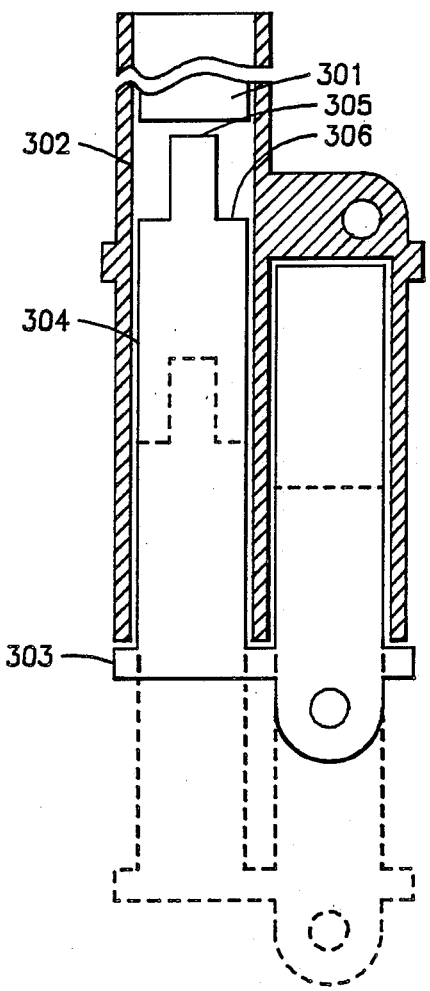
FIG. 4 is a cross sectional illustration of one embodiment of the disclosed invention for use in a suspension height sensor.

FIG. 4 illustrates a practical embodiment of the disclosed invention as a vehicle height sensor. In this embodiment, the circuit described in FIG. 1 (301) is secured to the upper portion of a housing (302) connected to a vehicle or an upper portion of a vehicle suspension member. The circuit (301) transmits acoustical signals to areas within the housing (302) and receives reflective echoes therefrom. The housing can be a hollow oblong tube or other structure, as appropriate to the application. A lower housing (303) comprises an insert (304) into the upper housing (302). This lower housing (303) is connected to a lower portion of a vehicle suspension member and is operative to move within the upper housing (302) in direct relation to the movement of the lower portion of the vehicle suspension member to the upper portion of the vehicle suspension member or the vehicle itself. The insert (304) of the lower housing (303) is constructed to provide two reflective surfaces (305 and 306) to the acoustical signals from the circuit (301). The reflective surfaces (305 and 306) maintain a fixed, known distance from each other during the movement of the insert (304) within the upper housing (302).

In the embodiment described, acoustical signals are transmitted by the circuit (301) and subsequently received from a first reflective surface (305) and then a second reflective surface (306). By processing the signals received, the height of the attached suspension member of the vehicle can be determined. Such information can be used then to increase or decrease the height of a vehicle's suspension or the damping effect of a vehicle's shock absorbers in response to road conditions and vehicle load.

What is claimed is:

1. A system for determining the position of a known moving object including:
   (a) first means, separate from the moving object, for sending signals to and receiving reflected signals from the moving object;
   (b) a first reflective surface associated and moving with the moving object;
   (c) a second reflective surface associated and moving with the moving object and maintaining a known, fixed distance from said first reflective surface;
   (d) second means coupled to said first means for:
      (i) determining a first value of time related to the time between said first means sending a signal to the moving object and receiving at least one reflection of said signal from the moving object;
      (ii) determining a second value of time related to the time between sending said signal to the moving object and receiving at least one additional reflection of said signal;
      (iii) using said first and second values of time and said known fixed distance to facilitate identifcation of valid signal reflections by said first and second surfaces and using time values for identified valid signal reflections from said first and second surfaces, and said known fixed distance, for determining a position of the moving object with respect to said first means;
   wherein said second means opens at least one time window, after reception of said at least one reflection by said first means, during which reflections of said signal from said second reflective surface are expected to be received.

2. The system as set forth in claim 1, wherein the first means for sending and receiving signals is an ultrasonic transceiver.

3. The system as set forth in claim 1 wherein the opening of said at least one time window is determined, at least in part, by said fixed distance.

4. The system as set forth in claim 3 wherein said first and second reflective surfaces are carried by said moving object and said first means is closer to said first surface than said second surface.

5. A device for sensing vehicle suspension height, including:
   (a) a hollow, oblong structure with an open end, said structure being secured to a vehicle;
   (b) first means for sending and receiving signals in said hollow, oblong structure and secured to said hollow, oblong structure;
   (c) an insert into said hollow, oblong structure, said insert comprising at least two reflective surfaces with each reflective surface being operative to reflect a signal from said first means back to said first means through said hollow, oblong structure;
   (d) said insert being secured to a vehicle suspension member and operative to move within said hollow, oblong structure in direct relation to the movement of the vehicle suspension member to the vehicle; and
   (e) electronic means connected to said first means for determining and comparing the length of time between said first means sending a signal to and receiving reflected signals from each of the reflective surfaces of said insert and utilizing such lengths of time and said known fixed distance between said reflective surfaces to determine the height of the suspension member;
   wherein the first means for sending and receiving signals is an ultrasonic transceiver, and wherein said electronic means utilizes said known fixed distance to determine a proper time relationship which should exist between reception of reflected signals by said first means if said reflected signals correspond to reflections of said signal by each of said two reflective surfaces of said insert, and wherein said electronic means includes means for setting up a time window, after reception of a reflected signal by said first means from one of said reflective surfaces, during which reception of a reflected signal by said first means from another of said reflective surfaces is expected.

6. The device as set forth in claim 5 wherein the opening of said time window is determined, at least in part, by said fixed distance.

* * * * *

UNITED STATES PATENT AND TRADEMARK OFFICE
CERTIFICATE OF CORRECTION

PATENT NO. : 4,964,104
DATED : October 16, 1990
INVENTOR(S) : Zbynek A. Capurka It is certified that error appears in the above-identified patent and that said Letters Patent is hereby corrected as shown below:

Claim 5, line 36: insert "a fixed known distance from each other, and each reflective surface being" after -- reflective surface being --.

Signed and Sealed this

Twenty-fifth Day of August, 1992

*Attest:*

DOUGLAS B. COMER

*Attesting Officer*  *Acting Commissioner of Patents and Trademarks*